US012617210B2

(12) United States Patent
Horrocks et al.

(10) Patent No.: US 12,617,210 B2
(45) Date of Patent: May 5, 2026

(54) PRINTING UNIT WITH AEROSOL EXTRACTORS FOR OVERLAPPING PRINTHEADS

(71) Applicant: MEMJET TECHNOLOGY LIMITED, Leopardstown (IE)

(72) Inventors: Glenn Horrocks, North Ryde (AU); Samuel Mallinson, North Ryde (AU); Michael Hudson, North Ryde (AU); Joseph Tharion, North Ryde (AU)

(73) Assignee: Memjet Technology Limited, Dublin (IE)

(*) Notice: Subject to any disclaimer, the term of this patent is extended or adjusted under 35 U.S.C. 154(b) by 138 days.

(21) Appl. No.: 18/659,314

(22) Filed: May 9, 2024

(65) Prior Publication Data

US 2024/0399750 A1 Dec. 5, 2024

Related U.S. Application Data

(60) Provisional application No. 63/505,348, filed on May 31, 2023.

(51) Int. Cl.
*B41J 2/21* (2006.01)
*B41J 2/17* (2006.01)

(52) U.S. Cl.
CPC .................................. *B41J 2/1714* (2013.01)

(58) Field of Classification Search
CPC ............................... B41J 2/215; B41J 2/1714
See application file for complete search history.

(56) References Cited

U.S. PATENT DOCUMENTS

2006/0238561 A1* 10/2006 Carcia ..................... B41J 2/165 347/30
2007/0229611 A1 10/2007 Nagashima
2015/0273835 A1* 10/2015 Arimizu .............. B41J 2/16585 347/30

* cited by examiner

*Primary Examiner* — Scott A Richmond
(74) *Attorney, Agent, or Firm* — Garson & Gutierrez, PC

(57) ABSTRACT

A printing unit includes: a unit chassis for mounting over a media feed path; first and second elongate printheads mounted on the unit chassis and positioned in an overlapping arrangement across the media feed path; a first aerosol extractor positioned downstream of the first printhead relative to the media feed direction; and a second aerosol extractor positioned downstream of the second printhead and the first aerosol extractor relative to the media feed direction. The first and second aerosol extractors are positioned at a same distance from their respective first and second printheads.

12 Claims, 2 Drawing Sheets

PRINTING UNIT WITH AEROSOL EXTRACTORS FOR OVERLAPPING PRINTHEADS

CROSS-REFERENCE TO RELATED APPLICATIONS

This application claims the benefit or priority to U.S. Provisional Patent Application Ser. No. 63/505,348 filed May 31, 2023, entitled "Printing Unit with Air Guides for Optimized Airflow", the contents of which being incorporated herein by reference in its entirety.

TECHNOLOGICAL FIELD

This disclosure relates to a high-speed printing unit. It has been developed primarily for optimizing print quality in a digital inkjet press.

BACKGROUND

Inkjet printers employing Memjet® pagewide technology are commercially available for a number of different printing applications, including desktop printers, digital inkjet presses and wideformat printers. Memjet® printers typically comprise one or more stationary inkjet printheads having a length of at least 200 mm, which are user-replaceable. For example, a desktop label printer comprises a single user-replaceable full color printhead, a high-speed inkjet press comprises a plurality of user-replaceable monochrome printheads aligned along a media feed direction, and a wideformat printer comprises a plurality of user-replaceable printheads in a staggered overlapping arrangement so as to span across a wideformat media feed path.

Analogue printing presses are conventionally used for relatively long print runs where the cost of producing dedicated printing plates is economically feasible. Increasingly, industrial print systems use single-pass digital inkjet printing for relatively shorter print runs. Digital inkjet printing avoids the high set-up costs of producing printing plates and allows each print job to be tailored to a particular customer. Desirably, web feed systems for existing analogue print systems should be adaptable so as to enable 'drop-in' inkjet modules in place of, for example, offset printing stations.

Memjet® printing technology, which uses rows of print chips butted end-on-end to construct a pagewide printhead, is highly suited for reducing the overall span of the print zone along a media feed direction. Each print chip has either four or five active nozzle rows, which may be used for redundant printing.

U.S. Pat. No. 10,857,821 (the contents of which are incorporated herein by reference in its entirety) describes a printing system having a configurable array of print modules, each print module having a respective monochrome printhead configured for single-pass printing. For example, four print modules may be arranged along a media path for full-color (CMYK) printing with 5× redundancy in each color plane. While the system described in U.S. Pat. No. 10,857,821 provides OEMs with flexibility in the design of inkjet presses, as well as high-quality and high-speed printing using 5× redundancy, the print modules must be aligned and spaced along the media feed path for full-color printing. This places demands on media feed systems, which are required to align all colors and, consequently, there are relatively high set-up costs for OEMs. Nevertheless, those costs are still significantly less than alternative pagewide printing systems that use overlapping print chips or very large print chips to achieve single-pass printing.

U.S. Pat. No. 10,293,609 (the contents of which are incorporated herein by reference in its entirety) describes a full-color pagewide printhead having two rows of butting print chips receiving ink from a common manifold. The printhead has 2× redundancy for each ink color provided by four active nozzle rows in each row of print chips.

U.S. patent application Ser. No. 18/309,412 filed Apr. 28, 2023 (the contents of which are incorporated herein by reference in it entirety) describes a printing unit with a cantilevered aerosol extractor.

U.S. Pat. Publication No. 2022/0324239 (the contents of which are incorporated herein by reference in its entirety) describes a printing unit with overlapping upstream and downstream printheads and an aerosol extractor.

It would be desirable to provide a low-cost printing unit having optimized aerosol extraction and airflow through the print zone(s), thereby optimizing print quality.

SUMMARY

In a first aspect, a printing unit is disclosed. In one embodiment, the printing unit includes: a base plate defining an elongate slot extending across a media feed path; an elongate printhead positioned in the slot for printing onto print media fed along the media feed path; an aerosol extractor positioned downstream of the printhead relative to a media feed direction, the aerosol extractor providing an airflow through a print zone associated with the printhead; and air guides projecting from a lower surface of the base plate towards the media feed path, wherein the air guides are positioned at opposite ends of the printhead and comprise respective guide walls for directing the airflow towards the aerosol extractor.

The printing unit according to the first aspect advantageously achieves optimal airflow through the print zone of the printhead. By minimizing the extent to which air may be suctioned from lateral regions upstream of the printhead, a more unidirectional airflow (generally parallel with the media feed direction) through the print zone is achieved. This has the consequent advantage of improving print quality, especially for relatively high PPS (printhead-paper-spacing) printing e.g. 3 mm or greater PPS.

In another embodiment, there is provided a printing unit that includes: a unit chassis for mounting over a media feed path; first and second elongate printheads mounted on the unit chassis and positioned in an overlapping arrangement across the media feed path such that the second printhead is downstream of the first printhead relative to a media feed direction; a first aerosol extractor positioned downstream of the first printhead relative to the media feed direction, the first aerosol extractor extending into a gap between the unit chassis and the media feed path and providing an airflow through a first print zone associated with the first printhead; and a second aerosol extractor positioned downstream of the second printhead and the first aerosol extractor relative to the media feed direction, the second aerosol extractor extending into a gap between the unit chassis and the media feed path and providing an airflow through a second print zone associated with the second printhead, wherein the first and second aerosol extractors are positioned at a same distance from their respective first and second printheads.

The printing unit according to one embodiment advantageously achieves optimal airflow through the first and second print zones associated with first and second printhead. By placing each aerosol extractor immediately downstream of its respective printhead and at a same distance therefrom, each print zone has similar airflow characteristics which provides more uniform printing across the media feed path as well as effective aerosol extraction from each print zone.

As used herein, the term "inkjet module" is taken to mean an assembly of components, which includes an inkjet printhead, such as an elongate printhead configured for single-pass printing (known in the art as a "pagewide" or "linehead" printhead). The inkjet module typically includes one or more of the following components to provide a fully integrated inkjet system: maintenance components, such as a capper and/or a wiper; mechanisms for moving the printhead and/or maintenance components; ink delivery components, such as pump(s), valve(s), ink connector(s) etc; and electronic circuitry for supplying power and/or data to the printhead.

As used herein, the term "ink" is taken to mean any printing fluid, which may be printed from an inkjet printhead. The ink may or may not contain a colorant. Accordingly, the term "ink" may include conventional dye-based or pigment based inks, infrared inks, fixatives (e.g. pre-coats and finishers), 3D printing fluids, solar inks, biological fluids, sensing fluids and the like.

As used herein, the term "mounted" includes both direct mounting and indirect mounting via an intervening part.

BRIEF DESCRIPTION OF DRAWINGS

Specific embodiments of the present disclosure will now be described by way of example only with reference to the accompanying drawings, in which.

DETAILED DESCRIPTION

Figure 1:
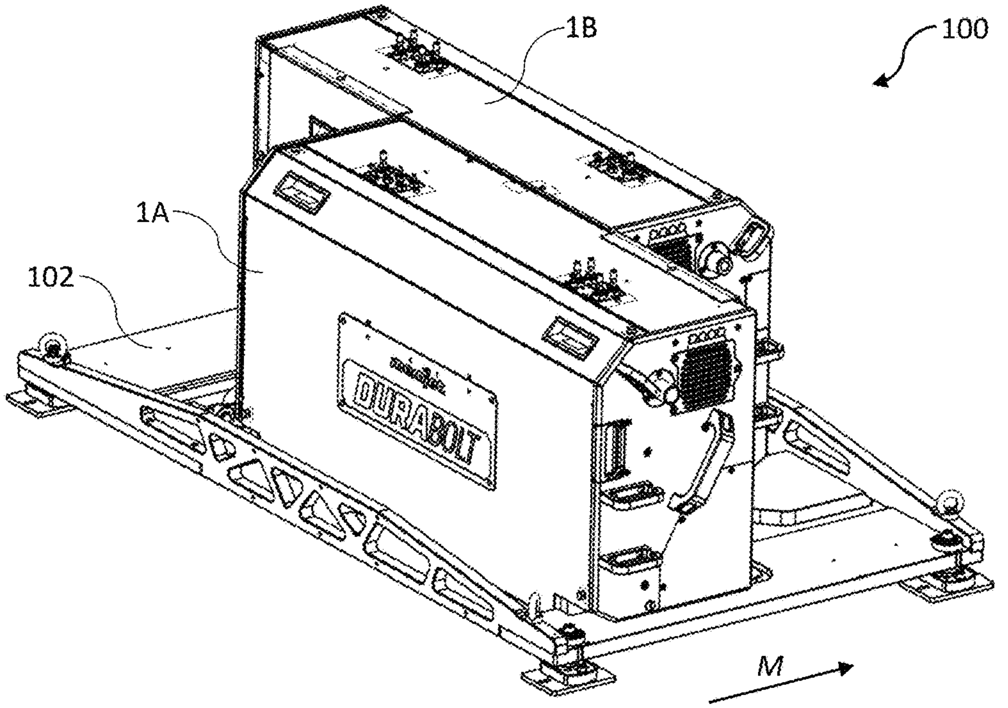
FIG. 1 is a top perspective of a printing unit.
Figure 2:
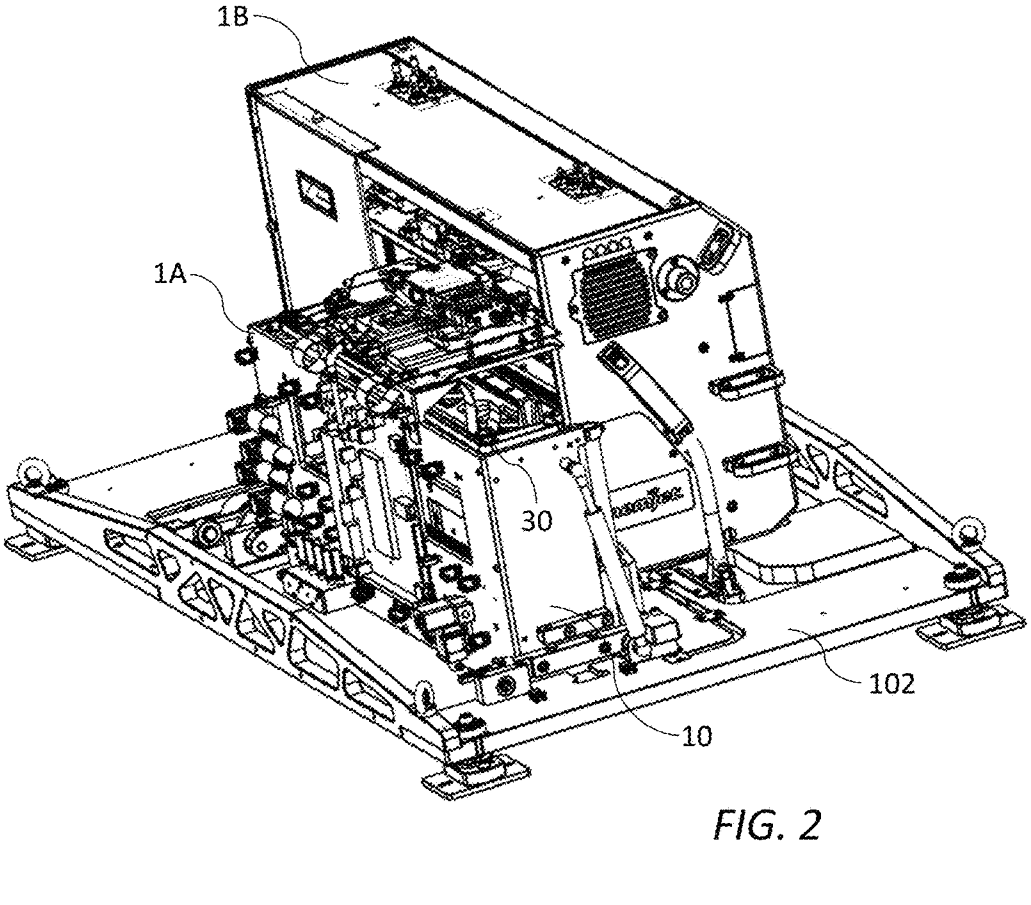
FIG. 2 shows the printing unit with a cover for the first (upstream) inkjet module removed.

Referring to FIGS. 1 and 2, there is shown a printing unit 100 comprising a pair of opposed first (upstream) and second (downstream) inkjet modules 1A and 1B pivotally mounted on a unit chassis 102 in forward and reverse orientations. An individual inkjet module 1 is described in detail in Applicant's U.S. patent application Ser. No. 18/309,004, filed Apr. 28, 2023, the contents of which are incorporated herein by reference in its entirety. Essentially, each inkjet module 1 comprises: a module chassis 10 configured for pivotal mounting on the unit chassis 102: a printhead carrier 30 comprising a respective printhead 3 and associated electronics; a lift mechanism (not visible in the FIGS.) for moving the printhead carrier relative to the module chassis towards and away from a media feed path; and a capper and wiper (not visible in the FIGS.) for maintaining the printhead.

The printing unit 100 is similar to that described in U.S. patent application Ser. No. 18/309,412 filed Apr. 28, 2023, except that the opposed upstream and downstream inkjet modules 1A and 1B, and thereby upstream and downstream printheads 3A and 3B, are positioned in an overlapping arrangement, typically for 8× redundant monochrome printing onto relatively wide media. In contrast, the tandem arrangement described in U.S. patent application Ser. No. 18/309,412 has opposed upstream and downstream inkjet modules that are fully aligned with respect to the media feed direction, typically for high quality 4× redundant full-color printing. Each printhead 3 is of the type described in U.S. Pat. No. 10,293,609 (the contents of which are incorporated herein by reference in its entirety) having two rows of butting print chips receiving ink from a common manifold. However, it will be appreciated that any single-pass printhead may be used in the printing unit 100.

Figure 3:
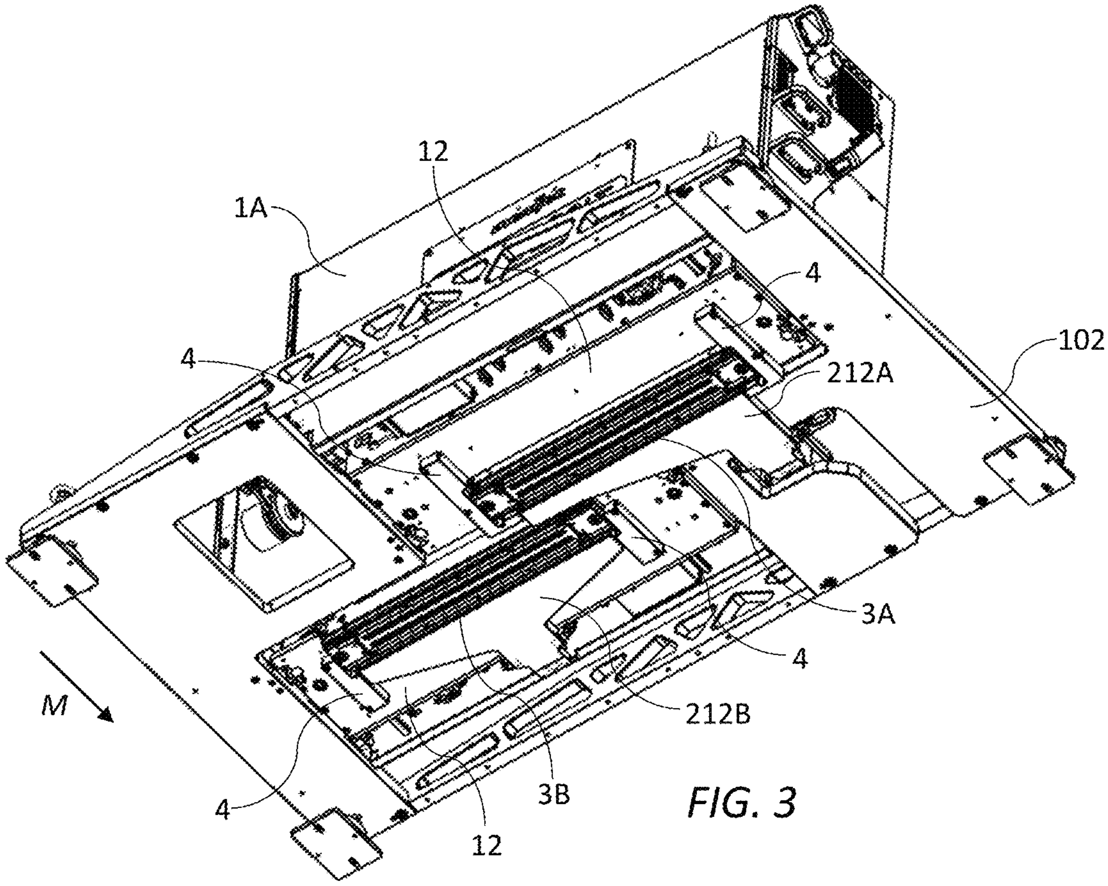
FIG. 3 is a bottom perspective of the printing unit.

Turning to FIG. 3, upstream and downstream printheads 3A and 3B (generically "printhead 3") can be seen at an underside of the printing unit 100. The printheads 3A and 3B are shown in their printing positions projecting through respective open slots defined by a C-shaped base plate 12 of each module chassis 10. Upstream and downstream aerosol extractors 212A and 212B (generically "aerosol extractor 212") are positioned immediately downstream of respective printheads 3A and 3B relative to the media feed direction indicated by arrow M. Proximal positioning of the aerosol extractors 212 to their respective printheads 3 is optimal for avoiding build up of ink aerosol downstream of the printheads as well as optimizing airflow through respective print zones. Typically, each aerosol extractor 212 is positioned less than 40 mm or less than 20 mm from its respective printhead 3. Each aerosol extractor 212 has a suction part 222 (e.g. suction slit or suction nozzles) proximal its respective printhead 3, the suction part being at least coextensive with nozzle rows defining a respective print zone of the printhead.

As shown in FIG. 3, the upstream and downstream aerosol extractors 212A and 212B necessarily have different configurations due to the geometric constraints of the regions downstream of the print zones, as well as the requirement for minimizing a distance between the upstream and downstream printheads 3A and 3B along the media feed direction M (e.g. less than 100 mm, or less than 80 mm separation). Accordingly, the upstream aerosol extractor 212A is generally asymmetric having a manifold arm 213 and a relatively narrow (e.g. less than 50 mm in width) finger portion 214 extending into a space between the upstream and downstream printheads 3A and 3B (see FIG. 4). On the other hand, the downstream aerosol extractor 212B has fewer geometric constraints and is generally symmetrically flared in plan view for optimizing uniform airflow across the downstream print zone.

Air guides 4 projecting downwards from each base plate 12 are positioned at either side of each printhead 3. The air guides 4 have respective guide walls 6 extending upstream from each aerosol extractor 212 for directing a flow of air through its respective print zone towards the aerosol extractor.

Figure 4:
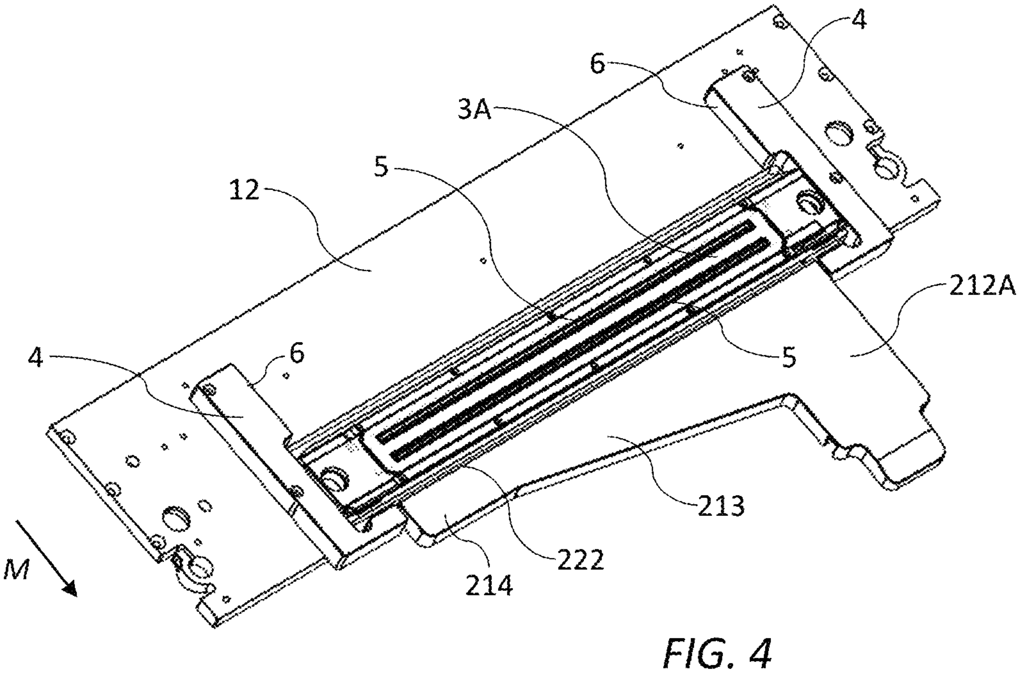
FIG. 4 is a bottom perspective of one printhead with its respective air guides and aerosol extractor.

The upstream printhead 3A is shown in FIG. 4 in isolation together with its corresponding base plate 12, aerosol extractor 212 and air guides 4. The guide walls 6 of the air guides 4 extend parallel with the media feed direction M and upstream of the printhead so as to encourage unidirectional airflow parallel with the media feed direction, through the print zone, and towards the aerosol extractor 212. Unidirectional airflow through the print zone is advantageous for optimizing print quality.

In the absence of the air guides 4, the aerosol extractor 212 tends to suck in air not only from the upstream regions aligned with the printhead 3, but also from upstream lateral regions offset from the printhead. Therefore, the air guides 4 are effective in optimizing airflow through the print zone by minimizing suctioning of air from these lateral regions.

A further advantage of the air guides 4 is that the dehydration performance of the inkjet nozzles is more even across the entire printhead, because all nozzles experience a similar airflow. In the absence of air guides, end nozzles of the printhead tend to receive an angled airflow from laterally offset regions, which tends to dehydrate these nozzles more than the nozzles positioned towards the center of the printhead. With nozzle dehydration controlled by keep-wet-spitting (see, for example, U.S. Pat. No. 9,545,787 assigned to the present Applicant), relatively higher dehydration of end nozzles is undesirable because more frequent keep-wet-spits (KWS) are required for all nozzles in the printhead to accommodate the relatively more dehydrated end nozzles. Minimal KWS is desirable for optimizing print quality and, therefore, the air guides advantageously assist in reducing the KWS requirements for the printhead.

Further optimization of airflow is achieved by extending the guide walls 6 in an L-shape from opposite ends of the printhead and partially along a downstream side of the printhead (that is, perpendicular to the media feed direction M) to meet with side edges of the aerosol extractor 212. In this way, the downstream side of the printhead 3 has the aerosol extractor 212 meeting with guide walls 6 at either side thereof, which extend continuously around and upstream of the aerosol extractor and, preferably, upstream of the printhead. This configuration, as best shown in FIG. 4, further minimizes the extent to which air may be suctioned from regions other than an upstream region aligned with the printhead.

It will be appreciated that the specific configuration of the air guides 4 may vary depending on geometric and/or mechanical constraints in the printing unit. However, print quality is generally improved with the use of air guides 4 extending at least partially along opposite ends of the printhead 3, which direct airflow parallel with the media feed direction M towards each aerosol extractor 212.

It will, of course, be appreciated that the present disclosure as been described by way of example only and that modifications of detail may be made within the scope of the disclosure, which is defined in the accompanying claims.

The invention claimed is:

1. A printing unit comprising:

a unit chassis for mounting over a media feed path;

first and second elongate printheads mounted on the unit chassis and positioned in an overlapping arrangement across the media feed path such that the second printhead is downstream of the first printhead relative to a media feed direction;

a first aerosol extractor positioned downstream of the first printhead relative to the media feed direction, the first aerosol extractor extending into a gap between the unit chassis and the media feed path and providing an airflow through a first print zone associated with the first printhead; and a second aerosol extractor positioned downstream of the second printhead and the first aerosol extractor relative to the media feed direction, the second aerosol extractor extending into a gap between the unit chassis and the media feed path and providing an airflow through a second print zone associated with the second printhead, wherein:

the first and second aerosol extractors are positioned at a same distance from their respective first and second printheads; and the first aerosol extractor is asymmetric in plan view and comprises a manifold arm having a finger portion positioned between the first and second printheads.

2. The printing unit of claim 1, wherein each of the first and second aerosol extractors is at least coextensive with the respective first and second print zones of the first and second printheads.

3. The printing unit of claim 1, wherein the finger portion has a width of less than 50 mm along the media feed direction.

4. The printing unit of claim 1, wherein the first and second aerosol extractors have different configurations.

5. The printing unit of claim of claim 1, wherein the first and second aerosol extractors have overlapping portions along the media feed direction.

6. The printing unit of claim 1, wherein the first and second aerosol extractors are positioned at a distance of less than 30 mm, along the media feed direction, from the respective first and second printheads.

7. The printing unit of claim 1, wherein the first printhead is part of a first inkjet module and the second printhead is part of a second inkjet module.

8. The printing unit of claim 7, wherein the first and second inkjet modules are mounted on a unit chassis in opposite forward and reverse orientations.

9. The printing unit of claim 1 further comprising first and second sets of air guides associated with the respective first and second aerosol extractors, the air guides having guide walls for directing an airflow towards its respective aerosol extractor.

10. The printing unit of claim 9, wherein the first set of air guides has guide walls extending upstream of the first aerosol extractor relative to the media feed direction.

11. The printing unit of claim 9, wherein the second set of air guides has guide walls extending upstream of the second aerosol extractor relative to the media feed direction.

12. The printing unit of claim 9, wherein lower surfaces of the first and second aerosol extractors and lower surfaces of the first and second sets of air guides are generally coplanar.

* * * * *